(12) United States Patent
Saitoh et al.

(10) Patent No.: US 7,438,453 B2
(45) Date of Patent: Oct. 21, 2008

(54) EXTERIOR MIRROR ASSEMBLY

(75) Inventors: Makoto Saitoh, Saitama (JP);
Tomohiko Sano, Saitama (JP);
Takayuki Domon, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/511,557

(22) Filed: Aug. 29, 2006

(65) Prior Publication Data
US 2007/0047049 A1 Mar. 1, 2007

(30) Foreign Application Priority Data
Aug. 31, 2005 (JP) ............................. 2005-251108

(51) Int. Cl.
*B60Q 1/26* (2006.01)
(52) U.S. Cl. ..................... 362/494; 362/544; 362/487
(58) Field of Classification Search ................ 362/494, 362/498, 551, 555, 559, 560, 540, 541, 543, 362/544, 545, 476, 492, 546, 135, 140, 511, 362/143, 503, 244, 245, 223, 249, 487; 359/602, 359/842, 871, 872, 844, 838; 340/475, 472, 340/463, 465, 425.5
See application file for complete search history.

(56) References Cited

U.S. PATENT DOCUMENTS

| | | | | |
|---|---|---|---|---|
| 6,325,517 | B1 * | 12/2001 | Kuo | ............................. 359/838 |
| 7,220,030 | B2 | 5/2007 | Yagi | |
| 2002/0057575 | A1 * | 5/2002 | Schwanz et al. | ............. 362/487 |
| 2003/0107827 | A1 * | 6/2003 | Marondel et al. | ........... 359/842 |
| 2003/0179583 | A1 | 9/2003 | Matsumoto et al. | |
| 2004/0190303 | A1 * | 9/2004 | Mishimagi | ................... 362/494 |
| 2004/0213009 | A1 * | 10/2004 | Yagi | ............................ 362/494 |
| 2005/0141229 | A1 * | 6/2005 | Sakai | ......................... 362/494 |
| 2005/0180032 | A1 | 8/2005 | Seguchi et al. | |

(Continued)

FOREIGN PATENT DOCUMENTS

CN 1521051 8/2004

(Continued)

OTHER PUBLICATIONS

English Derwent Abstract of European Publication EP 1 391 755 A2.*

*Primary Examiner*—Jong-Suk (James) Lee
*Assistant Examiner*—Kevin J. Spinella
(74) *Attorney, Agent, or Firm*—Carrier, Blackman & Associates, P.C.; Joseph P. Carrier; William D. Blackman (57) ABSTRACT

An exterior mirror assembly includes a mirror member, a housing and a light member. The mirror member is supported in the housing. The light member is attached to the housing to radiate light, having a luminous body and a lens mask configured to cover the luminous body. The housing has an outermost portion which lies outwardly furthest with respect to a width direction of a vehicle. The light member is disposed inside of the outermost portion with respect to a width direction of the vehicle and the lens mask is formed so that its shape smoothly continues to the outermost portion. A projection is formed on the lens mask so that a surface of the projection is inside of the outermost portion with respect to a width direction of the vehicle.

14 Claims, 5 Drawing Sheets

U.S. PATENT DOCUMENTS

| | | |
|---|---|---|
| 2005/0231970 A1* | 10/2005 | Kagawa ............... 362/494 |
| 2005/0254251 A1* | 11/2005 | Chou ................. 362/494 |
| 2005/0276057 A1 | 12/2005 | Takahashi et al. |
| 2006/0274543 A1 | 12/2006 | Takahashi et al. |

FOREIGN PATENT DOCUMENTS

| | | |
|---|---|---|
| EP | 1391755 A2 * | 2/2004 |
| EP | 1559614 | 8/2005 |
| JP | 03-63431 | 6/1991 |
| JP | 08-142745 | 4/1996 |
| JP | 09-030329 | 4/1997 |
| JP | 2000-103287 | 4/2000 |
| JP | 2002-337606 | 11/2002 |
| JP | 2003-237460 | 8/2003 |
| JP | 2004-291671 | 10/2004 |

* cited by examiner

EXTERIOR MIRROR ASSEMBLY

BACKGROUND OF THE INVENTION

The present invention relates to an exterior mirror assembly which has an exterior mirror and a side turn indicator.

An exterior mirror assembly for left and right rear views of a vehicle has been known in recent years, which has an exterior mirror including a mirror and a housing, and a side turn indicator which is attached to the housing so as to externally indicate a traveling direction (left or right) of the vehicle. It has been known that this type of side turn indicator is attached to a portion of the housing which is most outside of the housing with respect to a width direction of the vehicle, hereinafter referred to as "outermost portion", so as to allow desirable visibility and light distribution, particularly light distribution as viewed from rear (see patent document No. 1).

Patent document No. 1: Japanese Published Patent Application 2003-237460 (paragraphs 0018-0020, FIG. 1, FIG.4)

However, there has been a problem that because the side turn indicator, which is attached to the outermost portion of the housing as described above, is most susceptible to damage when the exterior mirror collides with an obstacle, which results in an increase in the number of times for replacement of the side turn indicator.

SUMMARY OF THE INVENTION

In view of the problem described above, the present invention provides an exterior mirror assembly which is able not only to allow desirable visibility and light distribution but also to prevent a side turn indicator (luminous body) from experiencing damage.

It is an aspect of the present invention to provide an exterior mirror assembly, which includes a mirror member, a housing and a light member. The mirror member is supported in the housing. The light member is attached to the housing to radiate light, having a luminous body and a lens mask configured to cover the luminous body. The housing has an outermost portion which lies outwardly furthest with respect to a width direction of a vehicle. The light member is disposed inside of the outermost portion with respect to a width direction of the vehicle and the lens mask is formed so that its shape smoothly continues to the outermost portion. A projection is formed on the lens mask so that a surface of the projection is inside of the outermost portion with respect to a width direction of the vehicle.

The exterior mirror assembly described above has the luminous body inside of the outermost portion of the housing so that the luminous body can avoid colliding with an obstacle while a collision of the exterior mirror occurs, which prevents the luminous body from experiencing damage. Since the projection formed on the lens mask of the luminous body is able to increase flexibility for application of light radiated by the lighting source, it is possible to obtain desirable visibility and light distribution. Because the lens mask is formed so that its shape continues to the outermost portion, it is possible that the outermost portion prevents damage caused for the lens mask, without adversely affecting an appearance.

It is another aspect of the present invention to provide an exterior mirror assembly, in which the lens mask is formed so as to extend inwardly further from the outermost portion with respect to a width direction of the vehicle as the lens mask lies more apart from the outermost portion, and in which the projection is formed apart from the outermost portion.

It should be noted that "apart from the outermost portion" is meant to represent being apart from the outermost portion by a certain distance and not in contact with it.

The exterior mirror assembly described above, which has the projection formed where it is possible to keep a relatively long distance to the outermost portion in a width direction of the vehicle, allows relatively large flexibility in determining a shape of the projection. This leads to flexible visibility and light distribution.

It is still another aspect of the present invention to provide an exterior mirror assembly, in which the luminous body includes a pair of directional light sources which is arranged in a vertical direction and the projection is apart at least one of upwardly and downwardly from the outermost portion, and wherein one of the light sources not only orients a pointing direction more backward than the other one, but also aligns the pointing direction with the projection.

Because the exterior mirror assembly described above is able to control the light distribution only by arranging the pair of light sources in a vertical direction so as to acquire different pointing directions, the exterior mirror assembly allows more structural simplification than a conventional one, which requires adjustment of a pair of light sources in forward, backward, left and right directions. Also, it is possible to increase a spatial efficiency as a result of arranging the light sources in a vertical direction. Because one of the pair of light sources has a pointing direction which is not only more backward than the other one but also oriented to the projection, it is possible to increase the light distribution as viewed from rear due to the pointing direction and refraction caused by the projection.

It is yet another aspect of the present invention to provide an exterior mirror assembly, in which the lens mask is formed to curve at the outermost portion from a forward portion to a side portion of the housing so that the lens mask folds at the outermost portion and the projection is formed in a backward end portion of the lens mask, and the pair of light sources is located more forward than the projection with respect to a forward-backward direction of the vehicle.

According to the exterior mirror assembly described above in which a light source, which is located more forward than the projection, radiates light toward it, it is possible to increase the light distribution as viewed from rear. Because the light sources are disposed forward relative to the projection, it is possible to eliminate a backward space otherwise required for placing the light sources in the lens mask. This allows the thickness of a backward portion of the luminous body to be less, accordingly decreasing the thickness of the housing (thickness of a rim of the housing). Because the rim of the housing tends to be smaller as viewed from rear, which contributes to a miniaturization of the housing as a whole, it is possible to increase direct visibility for a driver. Also it is possible to increase visibility of the luminous body as viewed from rear by increasing a ratio of the lens mask (luminous body) to the housing.

It is a further aspect of the present invention to provide an exterior mirror assembly, in which the luminous body is disposed on an upper side of the outermost portion.

The exterior mirror assembly described above in which the luminous body is disposed on the upper side of the outermost portion increases the visibility of luminous body, because a viewpoint of an observer is usually above the exterior mirror assembly.

It is a still further aspect of the present invention to provide an exterior mirror assembly, in which the projection is formed stepwise on an exposed surface of the lens mask and has a smooth slope which progressively approaches the exposed surface as the slope approaches backward with respect to a forward-backward direction of the vehicle.

Because the exterior mirror assembly described above allows a larger surface facing backward, it is possible to increase visibility as viewed from rear.

DESCRIPTION OF THE PREFERRED EMBODIMENTS

An embodiment of the present invention is now described with reference to the drawings.

First a brief explanation of a coordinate system is given. A three dimensional coordinate system applied to the following description is defined on a vehicle, to which an exterior mirror assembly is attached. An axis assigned to a direction in which the vehicle moves is called a forward-backward axis or longitudinal center line. In this system, forward and backward directions in relation to the front and rear of the vehicle are called front and rear, respectively. A width axis, which is perpendicular to the forward-backward axis, represents a direction of the width of the vehicle in which the exterior mirror assembly extends. Inward or outward is used with the width axis to represent how a position in the exterior mirror assembly is located relative to a longitudinal center line of the vehicle. An outward position is more apart from the center than an inward position. A vertical axis is perpendicular to a plane made by the forward-backward axis and width axis. Upward and downward coincide with an antigravitational direction and a gravitational direction, respectively.

Figures 1A, 1B:
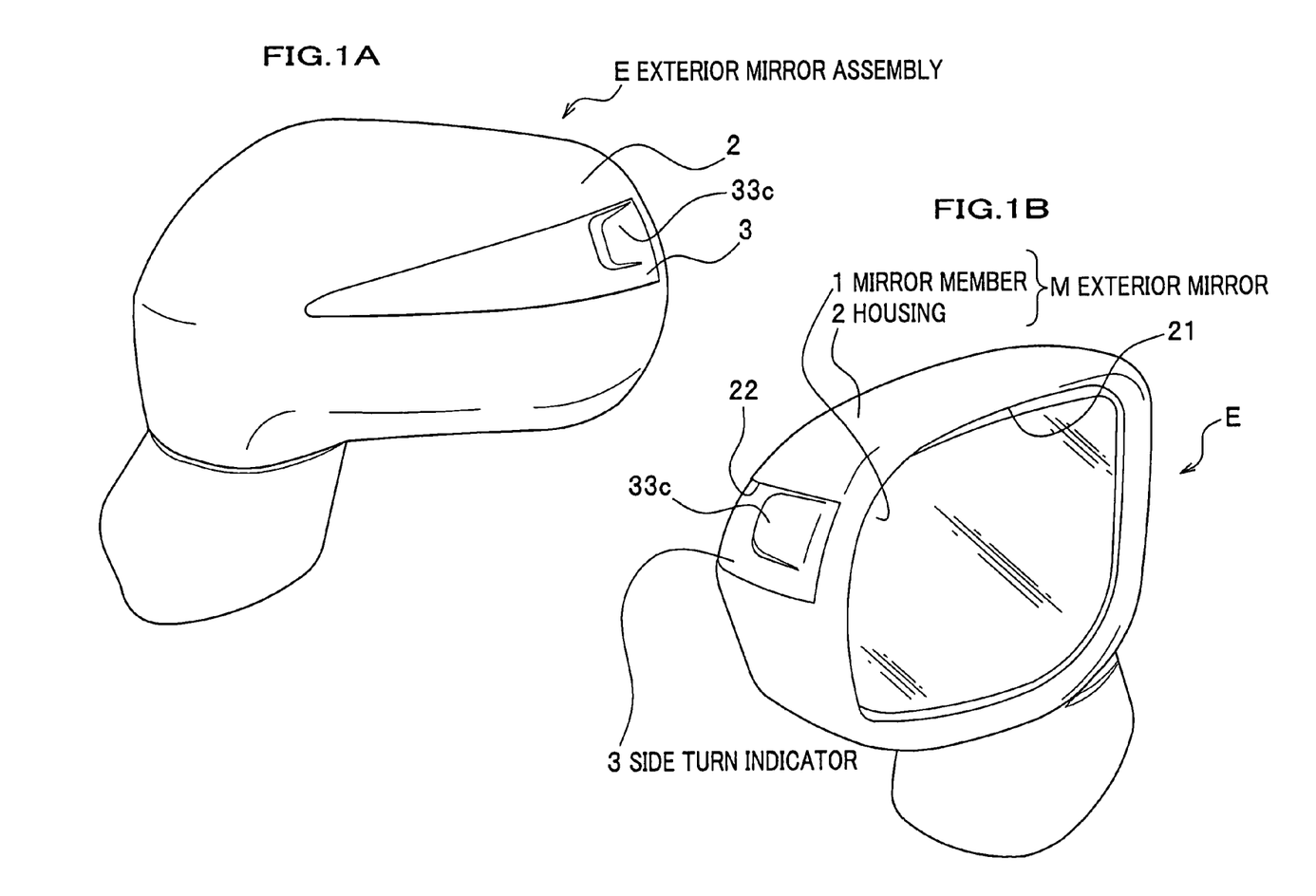
FIG. 1A is a perspective view showing an exterior mirror assembly as viewed from front according to the present invention.
FIG. 1B is a perspective view showing an exterior mirror assembly as viewed from rear according to the present invention.

As shown in FIGS. 1A and 1B, an exterior mirror assembly E, which is a component attached to left and right sides of a vehicle (not shown), has a side turn indicator (luminous body) 3 and an exterior mirror M including a mirror member 1 and a housing 2. The side turn indicator 3 radiates light, lying in an external surface of the housing 2. Description will be only given of the exterior mirror assembly E hereinafter, which is attached to the left side of the vehicle. Description will be omitted for an exterior mirror assembly mounted on the right side, which has a structurally mirror-symmetrical configuration.

The mirror member 1 is supported by the housing 2 via a free movable joint. An angle adjusting mechanism (not shown), which is disposed inside the housing 2, adjusts an angle of the mirror member 1. The angle adjusting mechanism is one of components included in the exterior mirror assembly E. A power supplier and a controller, which are disposed apart from the housing 2, namely inside of a vehicle body, are listed as other exemplary components.

Figure 2:
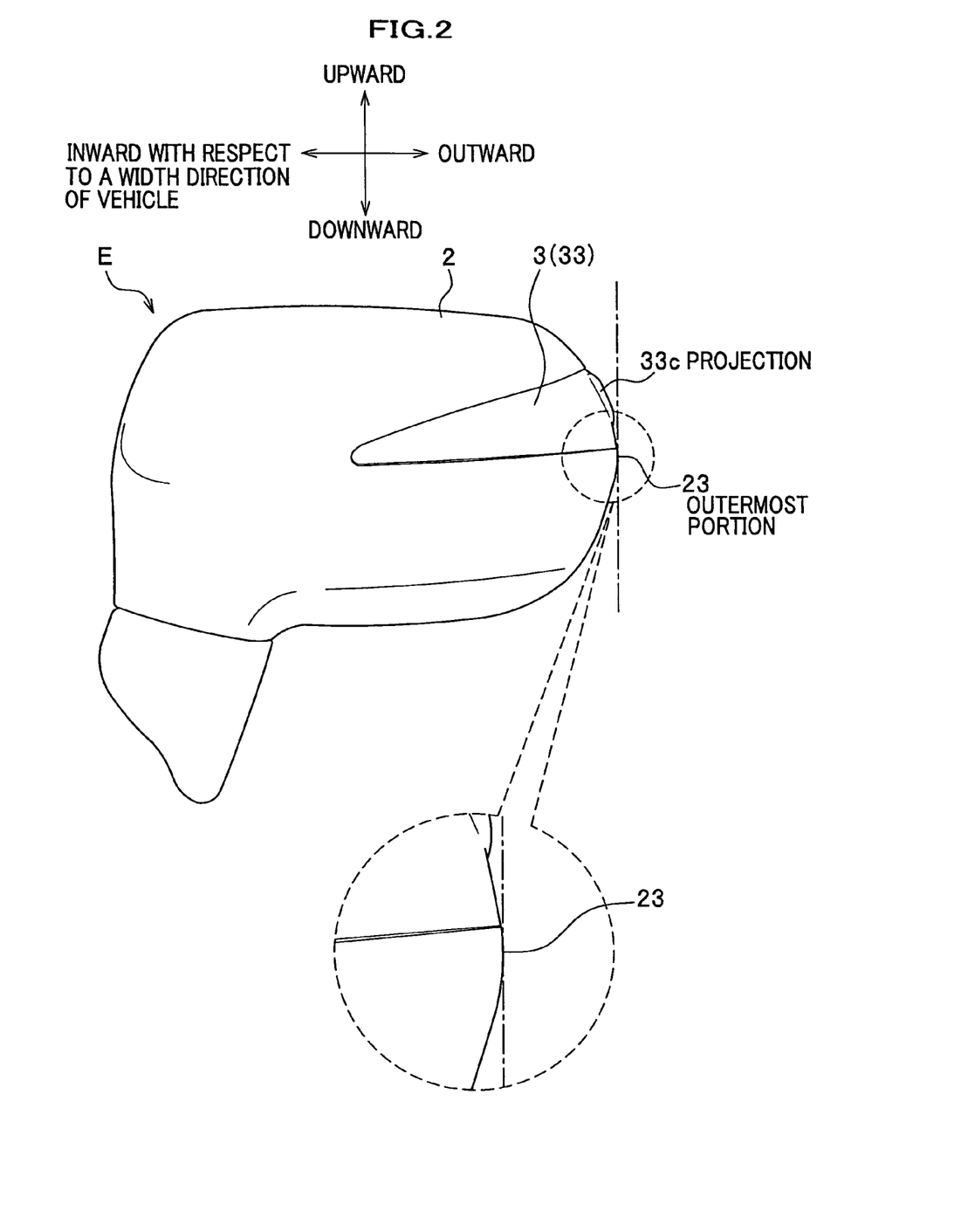
FIG. 2 is a front view showing an exterior mirror assembly as viewed from front.
Figure 3:
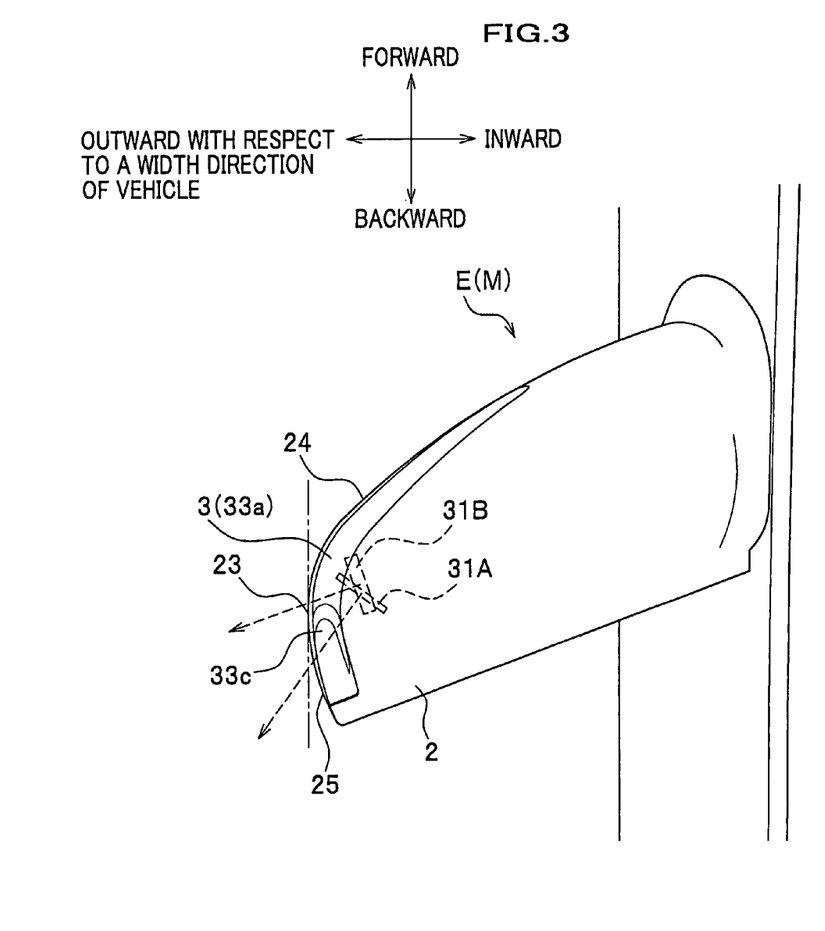
FIG. 3 is a plan view showing an exterior mirror assembly as viewed from top.

The housing 2 is generally shaped like a bowl, inside of which the mirror member 1 is supported. The housing 2 has not only a portion 21 for attaching the mirror member 1 on an opening side, but also a portion 22 defining a substantially wedge-shaped opening in the housing 2, for attaching the side turn indicator 3 to a shell of the housing 2. As shown in FIG. 2, the housing 2, which is shaped roughly like a rectangle as viewed from front, has an outermost portion 23, which is located substantially in a middle of the housing 2 with respect to a vertical direction so as to most outwardly project from the housing 2 with respect to a width direction of the vehicle. As shown in FIG. 3, the outermost portion 23 is located at an extremely outward position as viewed from the top when the exterior mirror M is in an extracted configuration (where the mirror M reflects a rear view). A forward portion 24 and a backward portion 25 are formed to curve so that these portions 24 and 25 approach more inward with respect to a width direction as they go apart further from the outermost portion 23 with respect to a forward-backward direction. In this way, the side turn indicator 3 is arranged to lie not only inside of the outermost portion 23 with respect to a width direction as viewed from top, but also on the upper side of the outermost portion 23 with respect to a vertical direction as viewed from front (see FIGS. 2 and 3).

Figure 4:
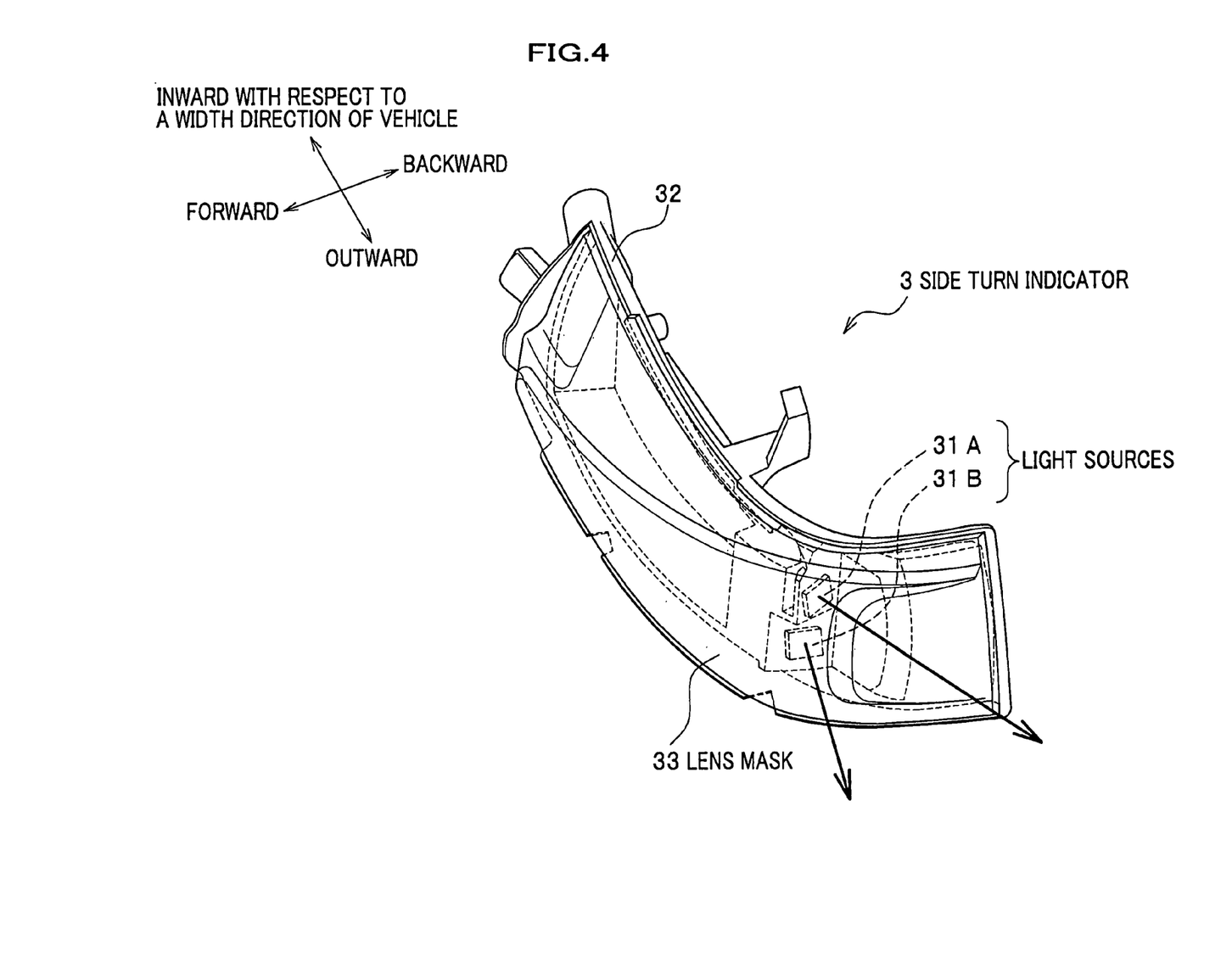
FIG. 4 is an overall perspective view showing a side turn indicator.

As shown in FIG. 4, the side turn indicator 3 has a pair of light sources (luminous body) 31A and 31B, a bracket 32 and a lens mask 33. The bracket 32 supports the light sources 31A and 32B. The lens mask 33 is attached to the bracket 32 so as to cover the light sources 31A and 31B.

The light sources 31A and 31B, which have their own directivity, are arranged in a vertical direction so that their pointing directions differ from each other. In this connection, the directivity described above represents characteristics that a light source radiates maximum luminous energy in a certain direction. As shown in FIG. 3, the pair of light sources 31A and 31B is arranged to be more forward than a projection 33c of the lens mask 33. The pointing direction of the upper light source 31A is oriented toward more backward than that of the lower light source 31B, and toward the projection 33c.

Figure 5:
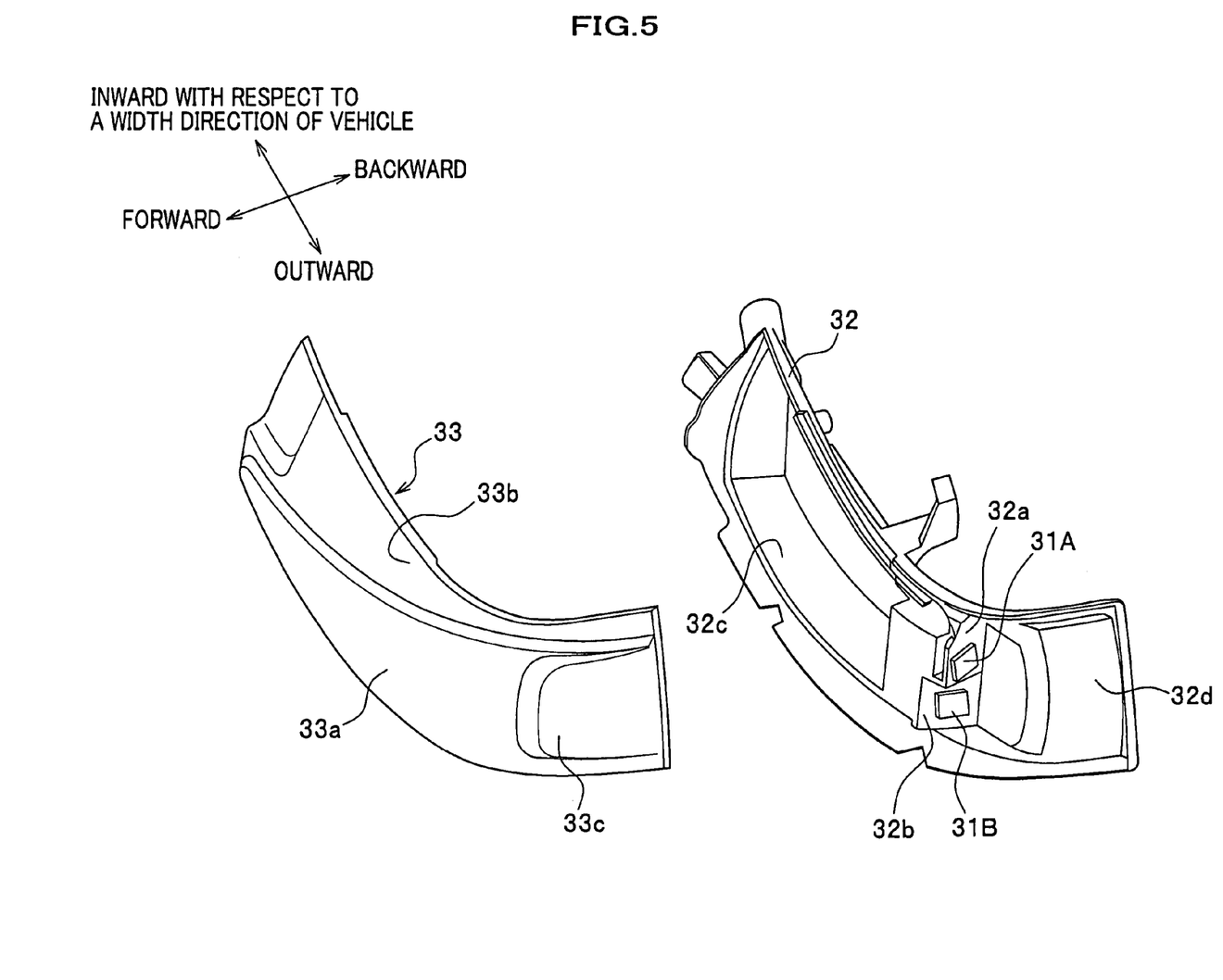
FIG. 5 is an exploded perspective view showing architecture of a side turn indicator.

As shown in FIG. 5, the bracket 32, which is formed to be compatible with a curved shape of the mask lens 33, has attachment portions 32a and 32b, on which the light sources 31A and 31B are supported so as to possess certain orientations, respectively. A long portion of the bracket 32, which extends in a width direction, has a recess 32c where a light source other than the pair of light sources 31A and 31B may be installed according to necessities. In contrast, it is not necessary to install a light source on a short portion 32d, which extends in a forward-backward direction, as a result of orienting the light source 31A facing backward. In this way, the short portion 32d is not formed to recess but instead, is substantially flat.

The lens mask 33 has an exposed surface 33a and a recessed mating portion 33b. The exposed surface 33a, which is substantially flush with an external surface of the housing 2, is exposed to an external environment during use. The mating portion 33b, which recesses stepwise with respect to the outwardly projected exposed surface 33a, is mated to be inside the housing 2. As shown in FIGS. 3, 4, and 5, the exposed surface 33a is formed generally in a wedge shape which fits into the wedge-shaped opening 22 of the housing 2 and is formed to make a curve in forward and side areas of the housing 2, so that the curve has an inflection point at the outermost portion 23. In other words, the lens mask 33 is formed to follow a curve similar to that defined by the forward portion 24, outermost portion 23 and backward portion 25. The lens mask 33 curves inward with respect to a width direction as it is apart from the outermost portion 23 in a forward-backward direction, with its curved shape continuous from the outermost portion 23 (see FIG. 2).

A backward distal portion of the exposed surface 33a has the projection 33c projecting outward with respect to a width direction, whose inner surface is positioned so as to be substantially perpendicular to the light which is radiated by the light source 31A in a left-backward direction. It is possible to introduce the light substantially perpendicular to an inner surface of the projection 33c so as to restrict reflection caused by this surface, which will lead to an increase in efficiency in terms of usage of light. This means that introduction of the projection 33c enables an increase in intensity of light radiated in a left-backward direction by the light source 31A, increasing visibility and light distribution as viewed from rear (right behind for example). More specifically, the projection 33c is formed stepwise on the exposed surface 33a and has a smooth slope which progressively approaches the exposed surface 33a as the slope approaches backward. As shown in FIGS. 2 and 3, an external surface of the projection 33c is inside of the outermost portion 23 with respect to a width direction. In this connection, the projection 33c is located on the upper side of the outermost portion 23, in other words, where it is possible to keep a relatively large distance to the outermost portion 23 with respect to a width direction. This allows flexibility in determining a shape for the projection 33c.

The embodiment of the present invention described above provides the following advantages.

Because the side turn indicator 3 is disposed inside of the outermost portion 23 of the housing 2 with respect to a width direction, it is possible to prevent the side turn indicator 3 from suffering from damage at a collision of the exterior mirror M. The projection 33c, which is formed on the lens mask 33 of the side turning indicator 3, enables desirable visibility and light distribution.

Because the projection 33c is formed where the distance to the outermost portion 23 with respect to a width direction can be selected to be relatively large, it is possible to have flexibility in determining a shape of the projection 33c, which allows desirable visibility and light distribution.

Because the light distribution is controlled only by arranging the pair of light sources 31A and 31B in a vertical direction so as to acquire different pointing directions, the exterior mirror assembly E allows more structural simplification than a conventional one, which requires adjustment of a pair of light sources in forward, backward, left and right directions. Because one of the pair of light sources 31A and 31B has a pointing direction which is more backward than the other one and oriented to the projection 33c, it is possible to increase the light distribution for the backward direction by selecting a pointing direction and a shape of the projection 33c.

The arrangement of the light source 31A to orient backward allows the short portion 32d of the bracket 32, which does not require a light source any more, to be substantially like a plate. This allows the thickness of a backward portion of the side turn indicator 3 (thickness of the lens mask 33 and the bracket 32) to be less, accordingly decreasing the thickness of the housing 2 (thickness of the rim of the housing 2 on a side of the turn indicator 3 shown in FIG. 1B). Because the rim of the housing 2 tends to be smaller as viewed from rear, which contributes to a miniaturization of the housing 2 as a whole, it is possible to increase direct visibility for a driver. In addition, it is possible to increase visibility of the side turn indicator 3 as viewed from rear by increasing a ratio of the lens mask 33 to the rim of the housing 2.

Because the side turn indicator 3 is disposed on the upper side of the outermost portion 23, it is possible to increase the visibility of the side turn indicator 3.

Because the lens mask 33 is formed with its shape smoothly continues to the outermost portion 23, the outermost portion 23 prevents the lens mask 33 from experiencing damage without degrading an appearance.

It will now be appreciated from the foregoing description that the present invention is not limited to the particularly illustrated embodiment discussed above and may be carried out in various modified forms. Although the embodiment described above has the outermost portion 23 as an integrated part of the housing 2, it is not limited to this but it may be alternatively possible to adopt a physically separate outermost portion.

The present invention is not limited to the lens mask 33 which is located on the upper side of the outermost portion 23. It may be alternatively possible to locate the lens mask 33 on a lower side of the outermost portion 23. In this case, it may be preferable from the point of view of design flexibility, but not necessarily, that the projection 33c is located on the lower side of the outermost portion 23, where a relatively large distance to the outermost portion 23 with respect to a width direction can be acquired.

Foreign priority document, JP2005-251108 filed on Aug. 31, 2005 is hereby incorporated by reference.

What is claimed is:

1. An exterior mirror assembly for installed placement on a vehicle having a longitudinal center line, said mirror assembly comprising:
   a mirror member;
   a housing in which the mirror member is supported, the housing having a shape with a substantially continuous curve formed therein extending from a front portion around to a side portion thereof, the housing having a shaped opening formed therein to receive part of a light member, and
   a light member which is attached to the housing to radiate light, the light member comprising a luminous body and a lens mask configured to cover the luminous body, the lens mask including an exposed surface having a shape configured to fit in the shaped opening of the housing and having a substantially continuous curve formed therein extending from a front portion around to a side portion thereof,
   wherein the side portion of the housing has an outermost portion which lies outwardly furthest from a longitudinal center line of the vehicle in an installed configuration thereof with respect to a width direction of a vehicle,
   wherein a portion of the light member is disposed closer to the longitudinal center line of the vehicle than the outermost portion of the housing with respect to the width direction of the vehicle, and the lens mask is formed so that a shape of the exposed surface of the lens mask continues from the front portion of the housing towards the outermost portion,
   wherein a projection is formed on the lens mask extending outwardly from the side portion of the exposed surface in a direction away from the longitudinal center line of the vehicle, said projection configured so that an outer surface of the projection is positioned closer to the longitudinal center line of the vehicle than the outermost portion of the housing with respect to the width direction of the vehicle, said projection having a rear end and a front end, wherein said rear end is oriented to extend both in a direction away from the front end of the vehicle and in an outward direction with respect to the width direction of the vehicle, and tapers towards said exposed surface as it extends rearwardly, and said front end of the projection forms a step shape that projects in an outward direction from the exposed surface with respect to the width direction of the vehicle.

2. An exterior mirror assembly according to claim 1, wherein the lens mask is formed so as to extend inwardly further from the outermost portion with respect to the width direction of the vehicle as the lens mask extends farther apart from the outermost portion and wherein the projection is spaced inwardly away from the outermost portion.

3. An exterior mirror assembly according to claim 2, wherein the luminous body comprises a pair of directional light sources which is arranged in a vertical direction and the projection is spaced upwardly or downwardly apart from the outermost portion, and wherein one of the light sources not only orients a pointing direction more backward than the other one, but also aligns the pointing direction with the projection.

4. An exterior mirror assembly according to claim 3, wherein the lens mask is formed to curve at the outermost portion from a forward portion to a side portion of the housing so that the lens mask folds at the outermost portion and the projection is formed in a backward end portion of the lens mask, and the pair of light sources is located more forward than the projection with respect to a forward-backward direction of the vehicle.

5. An exterior mirror assembly according to claim 2, wherein the lens mask comprises a substantially wedge-shaped exposed surface portion which tapers from a wider to a narrower height as the lens mask extends inwardly further from the outermost portion with respect to the width direction of the vehicle.

6. An exterior mirror assembly according to claim 2, wherein the exposed surface portion of the lens mask tapers from a wider to a narrower height as the lens mask extends inwardly further from the outermost portion with respect to the width direction of the vehicle.

7. An exterior mirror assembly according to claim 1, wherein the luminous body is disposed on an upper side of the outermost portion.

8. The exterior mirror assembly of claim 1, wherein said outermost portion is situated so as to protect said light member from damage.

9. An exterior mirror assembly for installed placement on a vehicle having a longitudinal center line, said mirror assembly comprising:
   a mirror member;
   a housing in which the mirror member is supported, the housing having a shape with a substantially continuous curve formed therein extending from a front portion around to a side portion thereof, the housing having a substantially wedge-shaped opening formed therein to receive a portion of a lens mask; and
   a light member which is attached to the housing to radiate light, the light member comprising:
      a bracket for supporting a luminous body,
      a luminous body attached to the bracket and comprising a plurality of light sources comprising a first light source oriented in a first direction and a second light source oriented in a second direction which is different from the first direction, and
      a lens mask configured to cover the luminous body, the lens mask comprising a recessed attachment portion and a substantially wedge-shaped exposed surface portion projecting outwardly from the attachment portion and configured to fit in the substantially wedge-shaped opening of the housing, the exposed surface portion having a substantially continuous curve formed therein extending from a front portion around to a side portion thereof
   wherein the side portion of the housing has an outermost portion which lies outwardly furthest from the longitudinal center line of the vehicle in an installed configuration thereof,
   wherein a portion of the light member is disposed closer to the longitudinal center line of the vehicle than the outermost portion of the housing with respect to the width direction of the vehicle, and the lens mask is formed so that a shape of the exposed surface of the lens mask continues from the front portion of the housing towards the outermost portion, and
wherein a projection is formed on the exposed surface portion of the lens mask extending outwardly from the side portion thereof in a direction away from the longitudinal center line of the vehicle, said projection configured so that an outer surface of the projection is positioned inside of closer to the longitudinal center line of the vehicle than the outermost portion of the housing, said projection having a rear end and a front end, wherein said rear end is oriented both in a direction away from the front end of the vehicle and in an outward direction with respect to the width direction of the vehicle, and tapers towards said exposed surface as it extends rearwardly, and said front end forms a step shape projecting outwardly from the exposed surface portion of the lens mask.

10. An exterior mirror assembly according to claim 9, wherein the projection is spaced inwardly away from the outermost portion, and wherein the lens mask is formed so as to extend inwardly further from the outermost portion with respect to the width direction of the vehicle as the lens mask extends farther apart from the outermost portion.

11. An exterior mirror assembly according to claim 10, wherein the plurality of light sources comprises a pair of directional light sources which is arranged in a vertical direction and the projection is spaced upwardly or downwardly apart from the outermost portion, and wherein one of the light sources not only orients a pointing direction more backward than the other one, but also aligns the pointing direction with the projection.

12. An exterior mirror assembly according to claim 9, wherein the lens mask is formed to curve at the outermost portion from a forward portion to a side portion of the housing so that the lens mask folds at the outermost portion and the projection is formed in a backward end portion of the lens mask, and the pair of light sources is located more forward than the projection with respect to a forward-backward direction of the vehicle.

13. An exterior mirror assembly according to claim 9, wherein the luminous body is disposed above and to the inside of the outermost portion.

14. The exterior mirror assembly of claim 9, wherein said rear end further includes an inner surface substantially perpendicular to said luminous body.

* * * * *